(12) United States Patent
Menten

(10) Patent No.: US 7,653,874 B2
(45) Date of Patent: Jan. 26, 2010

(54) METHODS AND DEVICES FOR GENERATING XML EXPRESSED MANAGEMENT TRANSACTIONS

(75) Inventor: Lawrence Edwin Menten, Short Hills, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1111 days.

(21) Appl. No.: 10/879,583

(22) Filed: Jun. 30, 2004

(65) Prior Publication Data

US 2006/0005203 A1 Jan. 5, 2006

(51) Int. Cl.
*G06F 17/00* (2006.01)
(52) U.S. Cl. ............. 715/234; 715/200; 707/104.1; 709/201
(58) Field of Classification Search ............ 715/234, 715/737, 743
See application file for complete search history.

(56) References Cited

U.S. PATENT DOCUMENTS

2002/0161801 A1* 10/2002 Hind et al. ............ 707/513
2002/0169858 A1 11/2002 Bellinger et al.
2008/0040657 A1* 2/2008 Kuznetsov et al. ........ 715/234

OTHER PUBLICATIONS

Ju H-T et al Institute of Electrical and Electronics Engineers: "An Embedded Web Server Architecture for XML-Based Network Management" 2002 IEEE/IFIP Network Operations and Management Symposium. NOMS 2002. Florence, Italy. Apr. 2002 (Apr. 15, 2002), pp. 5-18.

* cited by examiner

*Primary Examiner*—Doug Hutton
*Assistant Examiner*—Quoc A Tran
(74) *Attorney, Agent, or Firm*—The Capitol Patent & Trademark Law Firm, PLLC

(57) ABSTRACT

New XML management transaction requests including XPath expressions are used, for example, to forward configuration changes on to a data network device. The generation and use of these new requests helps reduce the costs associated with designing or upgrading data network devices. These new requests may be generated in a novel command line interface that has been augmented to give a user access to more configuration functions. Complex management transactions may be executed substantially simultaneously by a central management module using the new requests and their associated XPath expressions. In addition to configuration changes, the new requests may be used to obtain the current configuration of data network devices.

7 Claims, 3 Drawing Sheets

FIG. 2

```
       301
     201
   ⌜‾‾‾‾⌝  ⌜‾‾‾‾‾‾‾‾‾‾‾‾‾‾‾⌝
    <addRequest opId="5"         203
202   select="/root/configuration/protocol\
204     ospfv2[@id='4']"/">        204
        <area id="0" type="external">
203       <interface id="135.104.52.3"
              helloInterval="10" deadInterval="40"/>
          <interface id="135.104.54.2"
              helloInterval="10" deadInterval="40"/>
        </area>
    </addRequest>
          )
         302
```

FIG. 4

```
<request id="0">
  <ospfv2 id="4">
    <area id="0" op="add" type="external">
      <interface id="135.104.52.3"
          helloInterval="10" deadInterval="40"/>
      <interface id="135.104.54.2"
          helloInterval="10" deadInterval="40"/>
    </area>
  </ospfv2>
</request>
```

FIG. 3

```
<xsd:element name="configure" >
  <xsd:complexType>
    <xsd:sequence>
      <xsd:element ref="ospfv2"
        minOccurs="0" maxOccurs="unbounded"/>
      <xsd:element ref="alerting_group"
        minOccurs="0" maxOccurs="unbounded"/>
      <xsd:element ref="no_ospfv2_alerting_group"
        minOccurs="0" maxOccurs="0"/>
      <xsd:element ref="exit"
        minOccurs="0" maxOccurs="0"/>
    </xsd:sequence>
    <xsd:attribute name="mode"
      type="NMTOKEN" fixed="(config)#"
      use="prohibited" />
  </xsd:complexType>
</xsd:element>

<xsd:element name="ospfv2" >
  <xsd:complexType>
    <xsd:sequence>
      <xsd:element ref="area"
        minOccurs="0" maxOccurs="unbounded"/>
      <xsd:element ref="no_area"
        minOccurs="0" maxOccurs="0"/>
      <xsd:element ref="exit"
        minOccurs="0" maxOccurs="0"/>
    </xsd:sequence>
    <xsd:attribute name="id"
      type="xsd:unsignedInt" />
    <xsd:attribute name="enable"
      type="xsd:unsignedInt" />
    <xsd:attribute name="enableValue"
      type="xsd:unsignedInt" use="prohibited"/>
    <xsd:attribute name="mode" type="NMTOKEN"
      fixed="(config-router)#"
      use="prohibited" />
  </xsd:complexType>
</xsd:element>
```

METHODS AND DEVICES FOR GENERATING XML EXPRESSED MANAGEMENT TRANSACTIONS

BACKGROUND OF THE INVENTION

Modern day data networks include a number of remotely managed data network devices. Increasingly, the remote management of such devices has become more complex as subscribers to a network have demanded different services and as operators of a network have required new management tools.

The ability to support all of the services required by subscribers and the management needs of operators is a significant challenge. Today, it is not uncommon for a data network device to be connected with a number of different devices, called "clients" or "agents" (collectively referred to hereafter as "agent") each supplying a separate service to a subscriber. Unfortunately, each of these agents communicates with the data network device using different "management transaction requests." For example, each of these agents may attempt to send configuration changes to the data network device using instructions that are in a different protocol, format and/or a representation.

Because of this, data network devices, such as routers, must be designed to interpret or convert many different management transaction requests. This increases the cost of designing such a device.

It is, therefore, desirable to provide common management transaction requests which can be used by any number of agents to communicate configuration (or reconfigurations as the case may be) changes to a data network device.

One software language, called extensible mark-up language (XML) shows promise as a language that can be used to create a framework or structure within which such common management transaction requests can be created.

XML has been used in a network telecommunications environment before. One technique seeks to create architectures for XML-based, network management agents. To date, however, this technique has not been able to realize the potential flexibility and performance benefits believed possible.

In addition to subsystem interfaces, a number of leading data networking equipment vendors have employed XML-based representations and technologies within network management systems and managed agents/devices. These representations and technologies have their drawbacks, however, because they still require a significant amount of time to input, send and process configuration commands to a data network device or because they require the configuration of a data network device to be "locked" during a reconfiguration process. The latter being undesirable because it forces the data network device to handle reconfiguration related management transaction requests from individual users one at a time in order to avoid the possibility that an individual user's reconfigurations may be written over and therefore lost.

It is, therefore, also desirable to provide methods and devices that process management transaction requests as fast as possible and allow multiple users to send reconfiguration-based management transaction requests to a data network device without locking the present configuration of a data network device or one of its subsystems.

One type of program, called a command line interface (CLI), is commonly used to communicate configuration related management transaction requests to a data network device (e.g., TCP/IP routers, multi-protocol label switching (MPLS) switches, etc.). However, because of the cost involved in developing CLIs, existing CLIs do not provide a functionally complete or efficient means of reconfiguring a data network device.

It is, therefore, additionally desirable to provide for CLIs that provide full access to the management capabilities of a data network device or an associated subsystem.

In addition to being able to send configuration information to a data network device, users also need to periodically obtain the present configuration of one or more subsystems of a data network device.

Therefore, it is further desirable to provide means for obtaining such configurations using common management transaction requests.

SUMMARY OF THE INVENTION

We have recognized that an XML management transaction request, generated to include an "XPath expression" (referred to as "XML request" hereafter), can be used as a structure for creating common management transaction requests to both reconfigure one or more subsystems of a data network device or obtain the present configuration of such subsystems.

Such XML requests may include an XPath expression that is associated with a complex management transaction. Execution of such a request allows the XPath expression to at as a pattern matching expression to identify a number of different elements of a given subsystem configuration that, for example, are to be changed, etc., at substantially the same time. This reduces the time and cost of reconfiguring a data network device or an associated subsystem.

The use of XML requests that include XPath expressions also allows for the design of easier-to-use CLIs or other similar agents.

Because each agent provided by the present invention generates requests using the same XML request structure, the requests may be quickly processed by a central management module (CMM) within a data network device or the like.

Because the CMM only needs to process transactions using one common structure, the cost of designing data network devices may be reduced.

To make sure that small data networks are capable of making use of this common, XML request structure, the present invention provides for converting received XML requests into expanded, internal requests which do not contain XPath expressions. This is done to allow a given subsystem of a data network device, not capable of processing XPath expressions, to nonetheless process XML requests without processing XPath expressions. This keeps the cost of such subsystems down.

Alternatively, in larger data network devices, where the resource usage of such subsystems is not of prime concern, the present invention additionally provides for CMMs which pass XML requests, including XPath expressions contained therein, on to a subsystem for processing.

BRIEF DESCRIPTION OF THE DRAWINGS

FIG. 2 depicts a simplified example of an external XML request, that includes an XPath expression, generated by one or more agents.

FIG. 3 depicts an augmented, XML schema used to validate XML requests and to direct the operation of an XML schema driven CLI according to one embodiment of the present invention.

FIG. 4 depicts an internal XML expressed management transaction request that has been expanded by a CMM or the like and which does not include an XPath expression for use by one or more subsystems according to another embodiment of the present invention.

DETAILED DESCRIPTION OF THE INVENTION

Figure 1:
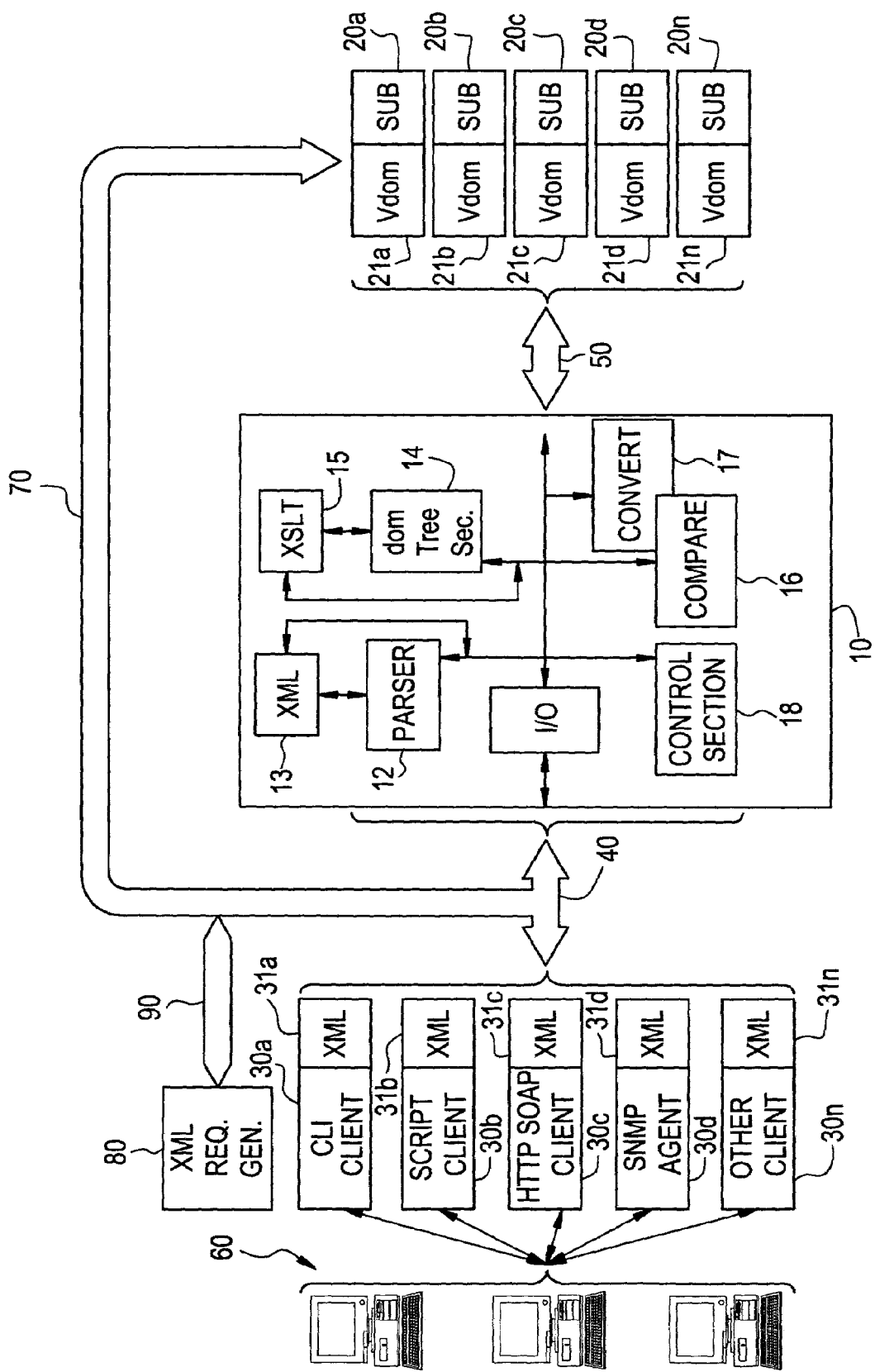
FIG. 1 depicts a data network which makes use of XML requests according to one embodiment of the present invention.

Turning now to FIG. 1, there is shown a data network 1 according to one embodiment of the present invention. As shown, network 1 comprises one or more agents 30a, 30b, . . . 30n (where "n" is the last agent) each comprising an XML interface 31a, 31b, . . . 31n connected to a CMM 10 via pathway 40. The CMM 10 is part of a data network device, such as a router, MPLS switch, etc. The CMM 10 may comprise an input/output (I/O) unit 11 for receiving external XML requests from one or more of the agents 30a, 30b, . . . 30n. Upon receiving the XML requests, the input/output unit 11 may be operable to forward the requests to a parser 12 which is operable to validate the syntax of each received request using a stored XML schema section 13. As described further below, it should be understood that the validation of the syntax of each received, XML request is optional. Continuing, the CMM 10 is also shown comprising a DOM Tree section 14 which is operable to store an overall DOM Tree which represents the configuration of all of the subsystems 20a, 20b, . . . 20n. The DOM Tree section 14 is also operable to generate one or more DOM Trees representing each received XML request as a step in determining whether each received XML request contains a configuration element contained in one of the subsystems 20a, 20b, . . . 20n. Said another way, the DOM Tree section 14 in conjunction with XSLT section 15 may be used to validate the semantics of each request. This is also optional.

Within CMM 10 there is also shown a comparison section 16, conversion section 17, and control section 18. The operation of these sections will be discussed in more detail below.

In one embodiment of the invention, each of the subsystems 20a, 20b, . . . 20n in FIG. 1 is operable to receive XML requests that may: change their configuration; allow access to state information (e.g., values of counters); or otherwise manage the subsystem. Alternatively, each subsystem 20a, 20b, . . . 20n may comprise a virtual DOM Tree interface 21a, 21b, . . . 21n. The interfaces 21a, 21b, . . . 21n are necessary when ad-hoc queries are sent to a subsystem in the form of XPath expressions, XQuery expressions or programming language scripts. The subsystems 20a, 20b, . . . 20n are connected to the CMM 10 using pathway 50 or the like and to agents 30a, 30b, . . . 30n by pathway 70.

While shown as separate sections, it should be understood that each of the sections making up CMM 10 may be combined to form fewer sections or, alternatively, broken down further to form additional sections. In one embodiment of the present invention, each of the agents, interfaces, CMM, CMM sections, and subsystems may be implemented in software, firmware, hardware or some combination of the three. In the case of software or firmware, each may comprise one or more programs or program components capable of carrying out the features and functions of the present invention discussed above and below.

Before discussing the operation of the components shown in FIG. 1, reference is now made to FIG. 2 where there is shown an example of a generated, external XML request according to one embodiment of the present invention.

As indicated before, the use of a common management transaction request structure would greatly reduce the costs associated with designing data network devices, such as routers and switches. Realizing this, the inventor discovered a new structure or form of XML expressed, management transaction requests. Namely, the inventor discovered that an XML expressed management transaction request that included an XPath expression allowed complex management transactions to be carried out quicker than previously thought possible. This is due, in part, to the fact that an XPath expression operates as a pattern matching expression to identify one or more target configuration elements within a subsystem The ability to carry out complex transactions using one XPath expression allows for the almost simultaneous processing of complex transaction requests with minimal locking requirements. In comparison, existing XML schemes require the configuration of a data network device to be locked over an extended period of time to allow for the receipt of complex transaction requests or requests from multiple sources.

The external XML request 200 shown in FIG. 2 is made up of a sequence of different segments. For ease of explanation, only some of these segments will be discussed. As shown, the request 200 comprises an element name segment 201, one or more attribute name segments, one of which is segment 202, and an XPath expression segment 203.

In general, the angled brackets "< >" delineate an XML start-tag or an XML end-tag. The XML request 200 begins with the start-tag 301 and ends with the end-tag 302. Within the start-tag 301 are listed the "attributes" of the element.

The attribute name segment 202 is associated with attribute values 204 contained within the XPath expression segment 203. The attribute values 204 and attribute name segment 202 may be used to identify a target of the XML request 200.

In one embodiment of the present invention, the element name segment 201 indicates an operation to be performed on at least one target configuration element of a subsystem's configuration, for example, to reconfigure the operation of a subsystem 20a, 20b, . . . 20n associated with the CMM 10.

As indicated above, when the XPath expression is executed it acts as a pattern matching expression. More specifically, the XPath expression identifies a target configuration element by, for example, following a path defined by the sequence of elements 204 in the order of they are nested within an XML configuration tree.

In sum, by using XML requests provided by the present invention a configuration element within a subsystem, which is the target of a simple, or complex, management transaction request initially originated by a user 60, may be identified quickly. In fact, much more quickly than previously thought possible.

Though the element name shown in FIG. 2 is indicated as "addRequest", it should be understood that a number of element names may be used. In further embodiments of the present invention, element name segment 201 may be selected from a group consisting of addRequest, deleteRequest, mergeRequest, replaceRequest, getRequest and commandRequest, to name just a few.

Because the XML request includes an XPath expression which identifies one or more configuration elements, it can also be said that the XPath expression comprises a target of an original, management transaction request input by a user 60 into one or more of the agents 30a, 30b, . . . 30n.

Backtracking somewhat, it should be understood that the XML request 200 shown in FIG. 2 may be generated by one or more of the agents 30a, 30b, . . . 30n and then sent to the CMM 10. To distinguish it from other XML expressed management transaction requests discussed later, this type of transaction has been, and will be referred to as an "external XML request." It should also be understood that the XML request 200 may be generated apart from the agents 30a, 30b, . . . 30n, for example, by an XML request generator 80 (e.g., a remote management system, server, etc.), and then downloaded, or otherwise input into agents 30a, 30b, . . . 30n.

As indicated above, XML requests provided by the present invention may contain an XPath expression which represents a complex management transaction. Such complex transactions may require that a plurality of target configuration elements be reconfigured or changed at the same time. Realizing this, the present invention provides for XML requests that comprise an element name segment that indicates an operation to be performed on a plurality of target configuration elements, an attribute name segment, where the name segment comprises an attribute name associated with each one of the plurality of target configuration elements and an XPath expression segment comprising an attribute value associated with each one of the plurality of target configuration elements.

As mentioned above, XML requests that are received by the CMM 10 along pathway 40 originate at one or more agents 30a, 30b, . . . 30n. These agents are novel agents provided by the present invention.

More specifically, each one of the agents 30a, 30b, . . . 30n may comprise a novel XML interface section 31a, 31b, . . . 31n operable to receive one or more conventional, management transaction requests from a user or users 60. Upon receiving the one or more requests, each XML interface section 31a, 31b, . . . 31n is operable to generate at least one XML request (which includes an XPath expression) for each received conventional request. The one or more received, conventional management transaction requests may comprise simple or complex management transactions.

The structure of the generated XML requests follows a similar structure as shown in FIG. 2.

The agents 30a, 30b, . . . 30n may comprise a number of types of agents, including a CLI client, an HTPP/SOAP client, an SNMP agent, or a Script client, to name just a few examples. Though a CLI may, in reality, only be one portion of an entire client/agent, for purposes of the present invention, the term CLI agent will refer just to the CLI unless otherwise stated or unless the context of the discussion below indicates otherwise.

In addition to generating XML requests, each of the agents 30a, 30b, . . . 30n may be further operable to validate the syntax of each of the so-generated XML requests using an XML schema. Generally speaking, an XML schema can be viewed as a grammar or vocabulary. In a further embodiment of the present invention, each of the agents 30a, 30b, . . . 30n is operable to use this grammar or vocabulary in order to verify that each generated XML request conforms to a vocabulary/grammar which is recognizable by the CMM 10 prior to sending the request on to CMM 10. In this manner, requests which do not contain a recognizable syntax (e.g., a recognizable element name, attribute name) are prevented from reaching the CMM 10. Unrecognizable requests may be the result of harmless error, or, alternatively, may be the result of a more deliberate attempt to hack or disrupt the CMM 10.

In a further embodiment of the present invention, CLI agent 30a may be further operable to generate one or more interactive sessions with a user or users 60. For example, CLI agent 30a may generate a session which includes features selected from at least the group consisting of user command feedback, context-sensitive help, modal behavior, and other customized features using an XML schema. Said another way, CLI agents 30a provides a user 60 with the opportunity to interactively create customized, context-sensitive XML requests that comply with an XML schema.

Though the XML schema may be stored within each of the agents 30a, 30b, . . . 30n, in an alternative embodiment of the present invention, each of the agents 30a, 30b, . . . 30n may be operable to receive the XML schema from a remote device, such as from the CMM 10 or from a remote network management system.

Upon receiving the XML schema, each of the agents 30a, 30b, . . . 30n may be operable to load the XML schema into a program, for example. Such a program may be operable to validate the syntax of XML requests.

In yet a further embodiment of the present invention, the XML interface 31a within the CLI agent 30a may receive an augmented, XML schema (or store an augmented XML schema). This augmented, XML schema includes additional instructions which customizes the interaction between a user 60 and CLI agent 30a. FIG. 3 depicts one example of an augmented XML schema according to one embodiment of the present invention. The augmented XML schema may be used to define command modes and associated command line prompts, and define when an ISO-like "no" prefix can be applied in a command, for example.

The XML schemas used by the agents 30a, 30b, . . . 30n may be augmented when features are added or removed from a managed device.

To make the CLI agent 30a even more user friendly, the present invention provides for a CLI which provides a user 60 with command history, command completion prompting, and command line editing.

As stated before, each of the agents generates requests using the same XML request structure. Because of this, the management requests received by the CMM 10 all conform to a common management transaction request structure which helps reduce the design of CMM 10 and/or the data network device which it is a part of.

Having invented a new XML request structure and ways to generate new XML requests, the present inventor realized that new CMMs capable of processing such requests needed to be provided as well.

In general, there are two types of CMMs which exist today; those with limited resources and those with, relatively speaking, unlimited resources. Said another way, there exists CMMs which include subsystems that are capable of carrying out sophisticated processing. These are the relatively unlimited resource CMMs. In contrast, some CMMs include subsystems that are only capable of a limited amount of processing. These are the limited resource CMMs. Depending on whether a CMM includes subsystems with limited or unlimited resources, determines how a CMM may process received, XML requests.

To begin with, we will discuss the limited resource CMMs.

If a subsystem has limited resources, in all probability it will not be able to process an XPath expression. Therefore, the external XML requests received from one or more agents 30a, 30b, . . . 30n must be converted into requests which do not contain XPath expressions. In one embodiment of the present invention, upon receiving at least one XML request that includes an XPath expression, the CMM 10 is operable to identify at least one subsystem 20a, 20b, . . . 20n associated with an attribute name and an attribute value within the request. When the identified subsystem has limited resources, the CMM 10 is further operable to convert the received request to an expanded, internal request which does not contain an XPath expression. The CMM 10 is further operable to then forward the expanded, internal request on to the identified subsystem. To distinguish this type of XML request from the external requests received from agents, this request will be referred to as an "internal" XML request. An example of an expanded, internal XML request is shown in FIG. 4. The request shown in FIG. 4 is an expanded version of the external XML request shown in FIG. 2.

This identification of a subsystem may be carried out by the control section 18 in conjunction with the comparison section 16, for example.

More specifically, to identify a subsystem the CMM 10 may first receive "ownership registrations" from one or more subsystems 20a, 20b, . . . 20n. These ownership registrations indicate which configuration elements are contained within which subsystems. Thereafter, in order to identify a particular subsystem, the CMM 10 may be further operable to compare one or more of the ownership registrations with the target configuration element within a received XPath expression. If a match occurs, this is an indication that the received XML expression should be forwarded on to the particular substation which had previously supplied the ownership registration that eventually matched the XPath expression.

When such a match occurs, the CMM 10, using conversion section 17, for example, may be operable to convert the received, external XML request into an expanded, internal request which does not contain an XPath expression. Thereafter, the CMM 10 via I/O section 11, for example, may be operable to forward the expanded, internal request on to the identified subsystem. Again, it is assumed that the identified subsystem has limited resources and, therefore, is not capable of processing an XPath expression.

Sometimes it is desirable for one subsystem to be notified of changes being made to other subsystems. Realizing this, the present invention provides for CMMs 10 capable of receiving one or more "notification registrations" from one or more subsystems 20a, 20b, . . . 20n. These notification registrations are a way for a subsystem to let a CMM know that it wants to receive a notice each time a particular change is made to another subsystem. More specifically, the CMM 10 is operable to receive one or more of these registrations, where each of the registrations is associated with at least one configuration element in a configuration of another subsystem. When CMM 10 receives an XML request that includes an XPath expression containing one of the configuration elements associated with a notification registration, the CMM 10 is further operable to forward a notification message on to one or more subsystems 20a, 20b, . . . 20n notifying the subsystem that it has received such an XML request. Thus, even though the received XML request is not sent on to the subsystem which originated the notification registration, nonetheless, the subsystem is informed of the receipt of such an XML request in order to keep track of changes made to another subsystem.

Some CMMs include subsystems that have relatively unlimited resources. In such a case, there is no need to convert received XML requests into internal requests that remove XPath expressions. Instead, in a further embodiment of the present invention, after the CMM 10 has identified at least one subsystem 20a, 20b, . . . 20n that is associated with an attribute name and attribute value within an XML request, it is operable to forward the received XML request on to the so-identified subsystem. Thereafter, the subsystem is capable of processing the request along with the XPath expression.

Up until now it has been assumed that either both the syntax and semantics of received XML requests have been proper or that an agent has validated both. In additional embodiments of the present invention, a CMM 10 is further operable to validate the syntax and semantics of each request before forwarding such a request on to a subsystem. In particular, in yet a further embodiment of the present invention, after receiving at least one external XML request which includes an XPath expression, the CMM 10 is operable to validate the syntax of this request using a stored XML schema. This validation may be carried out by a parser 12 in conjunction with the XML schema section 13 which is operable to store one or more XML schemas. The makeup of the XML schema stored within section 13 may vary, for example, depending on the capabilities of the CMM 10. As indicated before, it should be understood that validating the syntax of each incoming request is optional. In some cases, it is desirable in order to remove any request which is in an improper syntax especially those which have been generated by hackers or others with a mischievous intent.

In addition to validating the syntax of each external XML request, the CMM 10 may also validate the semantics of each request using a centralized DOM Tree which represents an overall configuration of the subsystems 20a, 20b, . . . 20n. That is, even though a received request may have a proper syntax (e.g., element name), such a request may contain attribute values which are not present within any of the subsystems 20a, 20b, . . . 20n. If such is the case, in order to save time, instead of forwarding a request on to a subsection and have it return an error message, the CMM 10 is further operable to identify any request which has invalid semantics and then return an error message to the originating agent or source of the request.

The CMM 10 may carry out this semantic validation using the DOM Tree section 14 in conjunction with the XSLT section 15. More specifically, upon receiving an external XML request, DOM Tree section 14 may be operable to generate a DOM Tree associated with the received request. Thereafter, the DOM Tree section 14 in conjunction with the XSLT section 15 may be operable to identify at least one target configuration element within the DOM Tree. Upon identifying a target configuration element within the generated DOM Tree, the DOM Tree section 14, in conjunction with the XSLT section 15, may be further operable to search a centralized DOM Tree, which represents the entire configuration of subsystems 20a, 20b, . . . 20n stored within section 14, in order to determine if the centralized DOM Tree contains a match for the identified element. If it does, the DOM Tree section 14 is yet further operable to identify a subsystem which is associated with the matched, identified element. If there is no match, then the DOM Tree section 14 is operable to send an instruction to the control section 18 or the like which generates an error message.

Continuing, when a match is found, the request may be forwarded on to an identified subsystem. As before, if the identified subsystem is one that has limited resources, then the request must be converted into an expanded, internal request that does not contain an XPath expression. If, on the other hand, a subsystem has relatively unlimited resources, then the original XML request which contains the XPath expression may be forwarded on to the identified subsystem.

So far we have discussed novel XML requests, agents and CMMs provided by the present invention. What remains is to discuss the novel subsystems provided by the present invention (though all of these are interrelated).

As indicated before, each subsystem 20a, 20, . . . 20n is able to generate ownership or notification registrations which are sent to the CMM 10 in order to provide the CMM 10 with an indication of the configuration elements which are stored within each subsystem and to provide the CMM 10 with a list, of sorts, of other subsystems which a given subsystem wants to monitor. When a subsystem has unlimited resources, it may be operable to carry out the syntax and semantic validations described above with respect to the CMM 10.

In yet an additional embodiment of the present invention, each of the subsystems 20a, 20b, . . . 20n may comprise a virtual DOM Tree interface 21a, 21b, . . . 21n. Each of these interfaces may be operable to receive a management transaction request and then: (a) return a present configuration of an associated subsystem; or (b) modify a configuration of an associated subsystem, based on the request.

The type of request received may vary. In one embodiment of the present invention, the request may be an XML request that includes an XPath expression containing at least one target configuration element. In another embodiment of the present invention, the request may comprise an XQuery expression. In yet another embodiment of the present invention, the request may comprise a programming language script.

In any event, once a given virtual DOM Tree interface 21a, 21b, . . . 21n receives a request, it is further operable to search an associated subsystem configuration to determine whether that configuration contains a match of at least one target configuration element contained in the request. When a match is found, the interface 21a, 21b, . . . 21n is further operable to return any matching elements that were found.

More specifically, upon receipt of a request, each interface 21a, 21b, . . . 21n is operable to apply an XML DOM API to the configuration and state information (e.g., value of counters, etc.), making up the subsystem. Thereafter, each interface is operable to apply the XPath, XQuery, or programming language script to a virtual DOM Tree using the applied API to determine if there is a match or perform script directed processing (e.g., extract the value of counters, etc.). If a match occurs, then the matching configuration or state element is returned in a responsive XML message. If not, an error message is returned, for example, to one or more agents 30a, 30b, . . . 30n. If the original XML request contained a programming language script, then any output generated in response to the script is returned in the content of the responsive XML message.

When a script is received by an interface 21a, 21b, . . . 21n, the interface may be operable to modify the configuration of an associated subsystem based on contents of the script, for example, when an appropriate match is found.

The above discussion has attempted to set forth examples of the present invention, the true scope of which is determined by the claims which follow.

I claim:

1. A central management module (CMM) operable to:
   receive at least one XML expressed management transaction request including an XPath expression;
   validate the syntax of the request using an XML schema;
   validate the semantics of the request using a centralized DOM Tree representing an overall configuration;
   convert the request to an expanded, internal request which does not comprise an XPath expression provided the request has a valid syntax and valid semantics;
   generate a DOM Tree associated with the request;
   identify at least one target configuration element within the DOM Tree;
   search a centralized DOM Tree to determine if the centralized DOM Tree contains a match for the identified element; and
   identify a subsystem associated with a match of the element identified within DOM Tree.

2. The CMM as in claim 1 further operable to:
   compare the request to an XML schema to validate the syntax of the request.

3. The CMM as in claim 1 further operable to forward the request on to the subsystem identified within the DOM Tree.

4. The CMM as in claim 1 further operable to:
   convert the request into an expanded, internal request which does not contain an XPath expression; and
   forward the internal request on to the subsystem identified within the DOM Tree.

5. A method for forwarding an extensible mark-up language (XML) expressed management transaction request to one or more subsystems using a central management module (CMM) comprising:
   receiving at least one XML expressed management transaction request including an XPath expression;
   validating the syntax of the request using an XML schema;
   validating the semantics of the request using a centralized DOM Tree representing an overall configuration;
   converting the request to an expanded, internal request which does not comprise an XPath expression provided the request has a valid syntax and valid semantics;
   generating a DOM Tree associated with the request;
   identifying at least one target configuration element within the DOM Tree;
   searching a centralized DOM Tree to determine if the centralized DOM Tree contains a match for the identified element; and
   identifying a subsystem associated with a match of the element identified within the DOM Tree.

6. The method as in claim 5 further comprising:
   comparing the request to an XML schema to validate the syntax of the request.

7. The method as in claim 5 further comprising forwarding the request on to the subsystem identified within the virtual DOM Tree.

* * * * *

UNITED STATES PATENT AND TRADEMARK OFFICE
CERTIFICATE OF CORRECTION

PATENT NO. : 7,653,874 B2  Page 1 of 1
APPLICATION NO. : 10/879583
DATED : January 26, 2010
INVENTOR(S) : Lawrence Edwin Menten It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1606 days.

Signed and Sealed this

Twenty-eighth Day of December, 2010

David J. Kappos
*Director of the United States Patent and Trademark Office*